(12) United States Patent
Enander

(10) Patent No.: US 6,314,734 B1
(45) Date of Patent: Nov. 13, 2001

(54) INTERNAL COMBUSTION ENGINE WITH AT REGULATOR

(75) Inventor: Niklas Enander, Gothenburg (SE)

(73) Assignee: Volvo Lastvagnar AB, Gothenburg (SE)

(*) Notice: Subject to any disclaimer, the term of this patent is extended or adjusted under 35 U.S.C. 154(b) by 0 days.

(21) Appl. No.: 09/424,950

(22) PCT Filed: Jun. 3, 1998

(86) PCT No.: PCT/SE98/01051

§ 371 Date: Feb. 24, 2000

§ 102(e) Date: Feb. 24, 2000

(87) PCT Pub. No.: WO98/55746

PCT Pub. Date: Dec. 10, 1998

(30) Foreign Application Priority Data

Jun. 4, 1997 (SE) .................................................. 9702121

(51) Int. Cl.⁷ .................................................. F02D 23/00
(52) U.S. Cl. ............................................................ 60/602
(58) Field of Search ................... 60/602, 39.98, 60/280

(56) References Cited

U.S. PATENT DOCUMENTS

| | | | |
|---|---|---|---|
| 3,672,164 | * | 6/1972 | Pieper .................................. 60/39.38 |
| 5,540,201 | * | 7/1996 | Feucht et al. ........................... 60/602 |
| 5,813,231 | * | 9/1998 | Faletti et al. ............................ 60/602 |
| 5,884,482 | * | 3/1999 | Lange et al. ............................ 60/624 |
| 5,894,731 | * | 4/1999 | Hakansson .............................. 60/602 |
| 6,085,524 | * | 7/2000 | Persson .................................. 60/602 |

FOREIGN PATENT DOCUMENTS

| | | |
|---|---|---|
| 0 335 086 | 10/1989 | (EP) . |
| 3-117665 | 5/1991 | (JP) . |
| WO 92/09792 | 6/1992 | (WO) . |

* cited by examiner

Primary Examiner—Thomas Denion
Assistant Examiner—Thai-Ba Trieu
(74) Attorney, Agent, or Firm—Young & Thompson

(57) ABSTRACT

Internal combustion engine with as exhaust pressure regulator (10) arranged in an exhaust conduit (5) for regulating the exhaust counter-pressure in the engine cylinders. Upstream of the exhaust pressure regulator, the exhaust conduit communicates via valve means (17) with the intake side of an air compressor (14) to make possible pre-charging of the compressor during engine braking.

8 Claims, 2 Drawing Sheets

INTERNAL COMBUSTION ENGINE WITH AT REGULATOR

This application is an 371 of PCT/SE 98/01051, dated Jun. 3, 1998.

BACKGROUND OF THE INVENTION

The present invention relates to an internal combustion engine with a shutter device arranged in an exhaust conduit for regulating the exhaust counter-pressure in the engine cylinders during engine braking.

It is known that the engine braking power of a vehicle can be increased with the aid of a shutter in the engine exhaust manifold. This exhaust pressure regulator provides continuous variation between a completely open position and a completely closed position. In the closed position, a counter-pressure can be created during the exhaust stroke of the engine, so that a pressure of up to 3–4 bar is created in the engine cylinders and the exhaust manifold, which increases the braking power of the engine during the exhaust stroke. The exhaust pressure regulator can also be used when the exhaust system is put into communication with the cylinders during the latter portion of the inlet stroke to achieve an inner charging, thus increasing the compression work after cutting off the communication between the cylinders and the exhaust system.

Vehicles with engines having exhaust pressure regulators are practically without exception heavy vehicles, such as trucks and buses, which have a number of pneumatically controlled installations and systems, such as pneumatic brakes, air springs etc., which are supplied with compressed air from air tanks charged by an air compressor usually driven mechanically directly by the engine. The air compressor takes its intake air from the surrounding atmosphere. The greater the air requirements the air consumers have, the greater will be the required capacity of the compressor and the greater the power is which must be extracted from the engine. Vehicles requiring exceptionally great amounts of compressed air are for example buses, which must be braked many times for stopping at bus stops and traffic lights and which also have pneumatically operated doors. Buses with air suspensions, which "dip" at bus stops, have extra large air requirements.

By EP 0 335 086 it is previously known to control a compressed air compressor driven by the vehicle engine via clutch, depending on the operating state of the vehicle, so that the clutch is engaged for driving the compressor and charging a compressed-air tank, when the engine operation changes from driving to braking. In this manner, the kinetic energy of the vehicle is used to drive the compressor, and a portion of the braking energy, which is otherwise lost as heat in the vehicle brakes, is instead used to drive the compressor. In this manner, the operating time of the compressor when the engine is in drive mode, is reduced.

SUMMARY OF THE INVENTION

The purpose of the present invention is to achieve an internal combustion engine of the type described by way of introduction, which makes it possible, more effectively than what is known, to reduce the operating time of a vehicle compressed-air compressor when the engine is in drive mode without reducing the capacity of the compressed-air system.

This is achieved according to the invention by virtue of the fact that the exhaust conduit, at a point upstream of the shutter device communicates with a conduit, which opens, via valve means, into an inlet to an compressor.

The invention is based on the idea of using the high pressure, on the order of 3–4bar arising in the engine exhaust manifold during engine braking with the exhaust pressure regulator activated, and pre-charging the air compressor with this air from the exhaust manifold instead of from an intake at atmospheric pressure. By allowing the compressor to get its air from the exhaust manifold during engine braking with an activated exhaust pressure regulator, the capacity of the compressor is multiplied several times, resulting in the compressed-air tanks being filled three to four times more rapidly than in a conventional compressed-air system. Since the overpressure used by the compressor is created when the engine is in braking mode, no extra fuel is consumed to create the overpressure. The reduction in the operating time of the compressor when the engine is in normal drive node, made possible by the arrangement according to the invention, results in fuel savings corresponding to what the work of the compressor would have otherwise consumed if the compressor had taken its intake air directly from the surrounding atmosphere.

BRIEF DESCRIPTION OF THE DRAWINGS

The invention will be described in more detail with reference to examples shown in the accompanying drawings, where.

Figure 1:
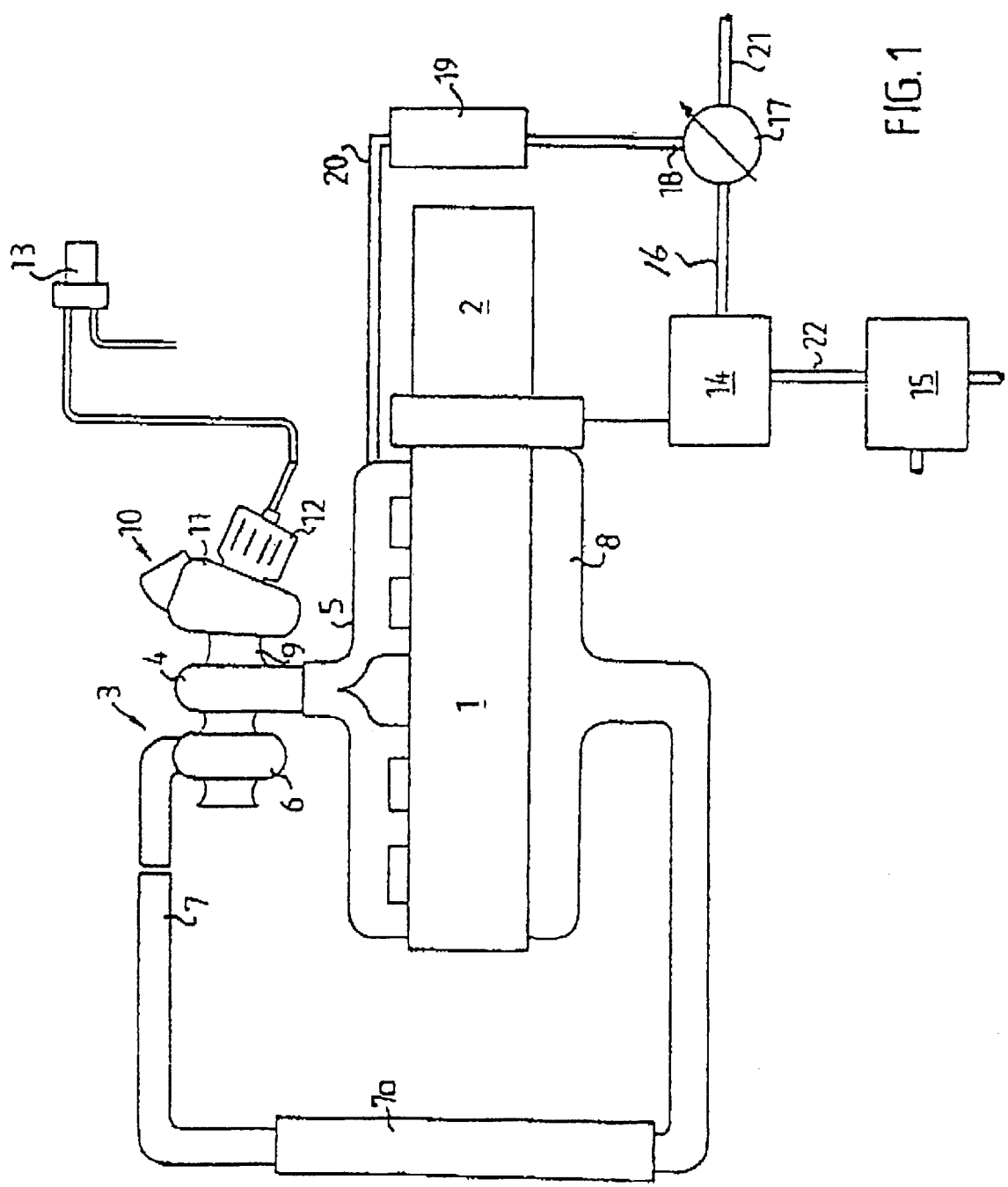
FIG. 1 shows a schematic representation of an internal combustion engine with an air compressor connected thereto.

DETAILED DESCRIPTION OF THE PREFERRED EMBODIMENTS 1 in FIG. 1 designates a six-cylinder diesel engine with a gearbox 2 connected thereto. A turbo-compressor generally designated 3, has its turbine portion 4 connected to the exhaust manifold 5 of the engine and its compressor portion 6 connected to the engine intake conduit 7, which opens, via a charge air cooler 7a, into an intake manifold 8.

The outlet 9 of the turbine 4 opens into an exhaust pressure regulator, generally designed 10, which can be of a type known per se and which comprises a shutter housing 11, containing a shutter (not shown) and a pneumatic regulator means 12, which is connected to the shutter and which is controlled by a regulator valve 13. With the air of the regulator means 12, the shutter of the regulator 10 can be adjusted continuously between the completely open and completely closed positions.

An air compressor, generally designated 14, is drivably coupled to the engine in a known manner which is not shown in more detail here. By means of a regulator system, not shown in more detail here, with among other things a pressure sensor for sensing the pressure in an accumulator 15, the engagement and disengagement of the electromagnetic clutch means (not shown) of the compressor 14 are controlled.

According to the invention, the compressor 14 has a suction conduit 16, which, via a valve controlled by a control system (not shown in more detail here) and a conduit 18 with a cooler 19, can be connected to a conduit 20 which opens into the exhaust manifold 5 of the engine 1.

During engine braking, when the engine is driven by the vehicle without opening the throttle, the engine functions in principle as an air pump or compressor pumping clean air from the intake manifold 8 to the exhaust manifold. To increase the braking power, the regulator 10 is closed, and a pressure on the order of 3–4 bar is created in the air in the exhaust manifold. If the valve 17 is now placed in a position connecting the suction conduit 16 of the compressor 14 to the conduit 20, at the same time as the compressor drive is engaged, the compressor 14 will be precharged with air from the exhaust manifold at a pressure of circa 3–4 bars. This means, in contrast to when the valve 17 in a position connecting the suction conduit 16 of the compressor to a conduit 21 opening to the atmosphere, that the accumulator 15, via a conduit 22, will be charged in a third or a fourth of its "normal" period with a corresponding fuel-saving over the case when the accumulator is charged as the engine drives. Alternatively, the principle of the invention can be used to replace a two-cylinder compressor in a conventional compressed-air system with a one-cylinder compressor which is pre-charged with exhaust manifold air. When the compressed air accumulator 15 need to be filled during normal engine operation, this is done with the valve 17 in the position in which the suction conduit 16 of the compressor 14 communicates with the conduit 21.

Figure 2:
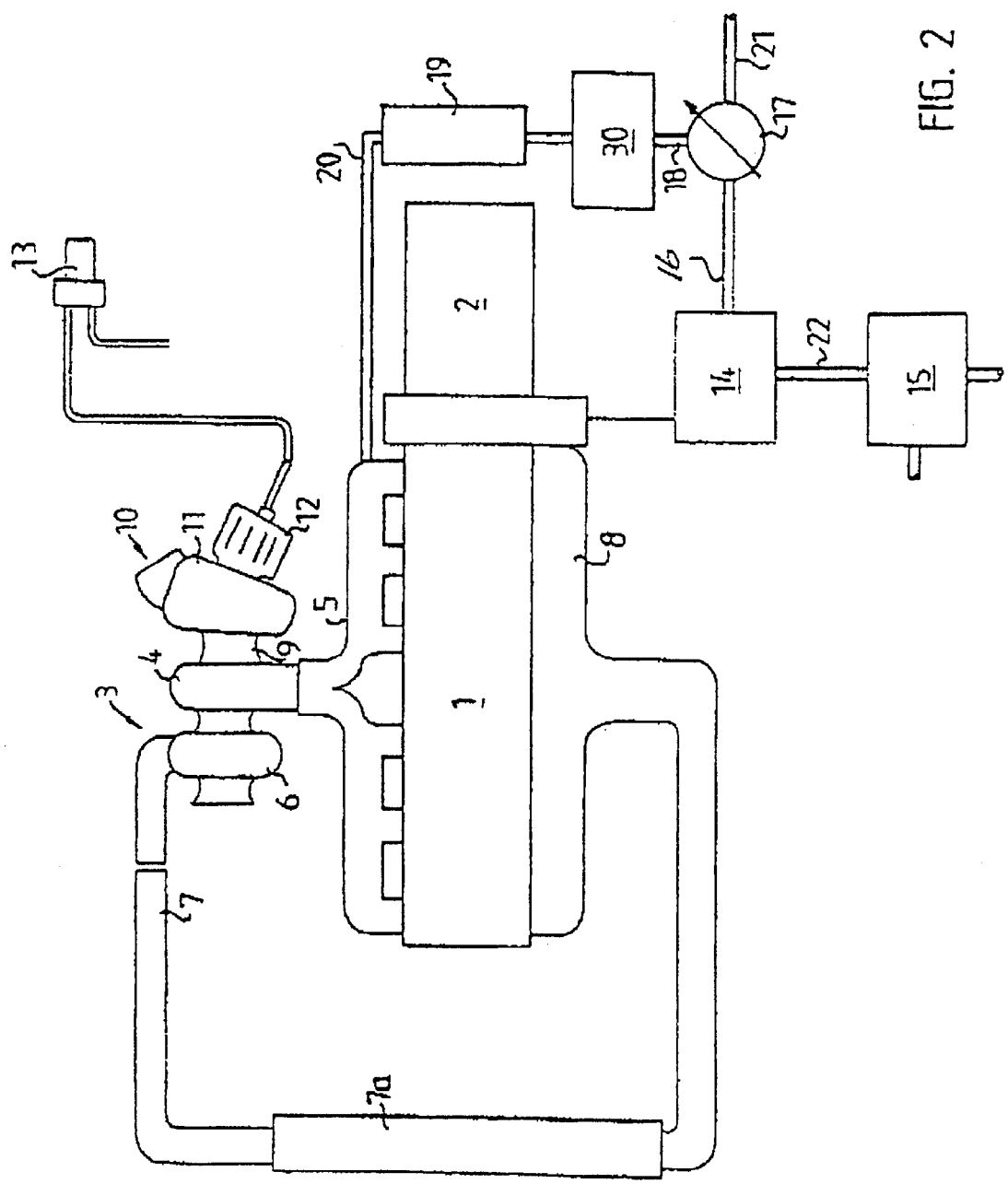
FIG. 2 is a corresponding schematic representation of a somewhat modified embodiment.

The embodiment in FIG. 2 differs from that described above by coupling an extra pressure accumulator 30 in the conduit 20 between the exhaust manifold 5 and the valve 17. In those cases when the main accumulator 15 during engine braking does not need to be filled up, the accumulator 30 can be charged to the exhaust manifold pressure of 3–4 bar. This means that there will be a certain air reserve at high pressure available later for pre-charging of the compressor during normal engine operation. The arrangement also makes it possible to utilize the exhaust manifold air in the accumulator 30 for different purposes. It is possible, for example, during a short period of time, to return the air to the intake side to provide supercharging in the engine cylinders at low engine rpm, when the charging capacity of the turbo-compressor is poor. The principle of the invention can also be utilized in an engine which can, in itself, function as a compressor by one or more of its cylinders being provided with extra valve devices and control means for intake, compression and exhaust of compressed air to a compressed-air tank. For a more detailed description of such an engine, reference is made, for example, to SE 467 503 B. In such an engine, the compressed air is led in the exhaust manifold back to the intake side of the engine for compression in an additional step before it is fed to the compressed-air tank via said extra valve means. "Air compressor" in the attached patent claims thus also comprises a compressor in an engine and compressor installation, where the compressor function is integrated in the internal combustion engine itself.

What is claimed is:

1. An internal combustion engine comprising:

an exhaust conduit;

a shutter device at an outlet of said exhaust conduit for regulating exhaust counter pressure in the engine's cylinders during engine braking;

a first conduit having a first end connected to said exhaust conduit, upstream of said shutter device; and a valve connecting a second end of said first conduit to an inlet of an air compressor.

2. The engine according to claim 1, wherein said valve has a first position to connect the inlet of the air compressor to said first conduit and a second position to connect the inlet of the air compressor directly to the surrounding atmosphere.

3. The engine according to claim 2, further comprising an accumulator tank and a compressed air conduit, said compressed air conduit connecting said accumulator tank to an outlet of the compressor.

4. The engine according to claim 2, further comprising an accumulator tank in said first conduit, between said exhaust conduit and said valve.

5. The engine according to claim 1, further comprising an accumulator tank in said first conduit, between said exhaust conduit and said valve.

6. The engine according to claim 5, further comprising an accumulator tank in said first conduit, between said exhaust conduit and said valve.

7. An internal combustion engine comprising:

an exhaust conduit;

an air compressor that selectively suctions exhaust at higher than atmospheric pressure from said exhaust conduit and air at atmospheric pressure from a surrounding atmosphere; and a first conduit with one end directly connected to said exhaust conduit and that receives the exhaust at higher than atmospheric pressure and a second end that provides the exhaust at higher than atmospheric pressure to said air compressor.

8. An internal combustion engine, comprising:

an exhaust conduit;

a turbo-compressor having a turbine in communication with said exhaust conduit;

an exhaust pressure regulator in communication with an outlet of said turbine, said exhaust pressure regulator comprising a shutter and a regulator valve that controls said shutter through a pneumatic regulator;

a first conduit having one end opening into said exhaust conduit upstream of said turbo-compressor;

an air compressor; and a valve selectively connecting an inlet of said air compressor to a second end of said first conduit and a surrounding atmosphere.

* * * * *